United States Patent

Willson et al.

[11] 4,073,194
[45] Feb. 14, 1978

[54] NOISE CHRONO-DOSIMETER SYSTEM

[75] Inventors: Robert D. Willson, Cincinnati, Ohio; Terry L. Henderson, Fort Mitchell, Ky.

[73] Assignee: The United States of America as represented by the Department of Health, Education and Welfare, Washington, D.C.

[21] Appl. No.: 731,092

[22] Filed: Oct. 8, 1976

[51] Int. Cl.² .............................................. G01H 5/00
[52] U.S. Cl. .......................................... 73/646; 73/23
[58] Field of Search ................. 73/552, 555, 556, 557, 73/558, 559, 67.9, 23; 179/1 N; 332/2

[56] References Cited

U.S. PATENT DOCUMENTS

| 3,286,177 | 11/1966 | Boer et al. | 73/23.1 |
| 3,595,069 | 7/1971 | Fowler | 73/67.9 |
| 3,608,363 | 9/1971 | Whittington | 73/67.9 |
| 3,778,552 | 12/1973 | Edinborgh | 73/558 |
| 3,802,535 | 4/1974 | Peake et al. | 179/1 N |

Primary Examiner—Richard C. Queisser
Assistant Examiner—Stephen A. Kreitman
Attorney, Agent, or Firm—Browdy and Neimark

[57] ABSTRACT

A system for the periodic sampling and recording of a condition, such as noise. The system employs a transducer which gates strings of pulses to a tape recorder. The gating time is in accordance with the transducer output voltage at sampling time. At each sampling, a delay in recording is provided to allow the recorder motor to come up to speed. The recorded tape may be played back and the grouped recorded pulses counted and presented as noise levels which can be plotted against time.

9 Claims, 3 Drawing Figures

NOISE CHRONO-DOSIMETER SYSTEM

FIELD OF THE INVENTION

This invention relates to environmental condition measuring systems, and more particularly to environmental noise monitoring techniques and apparatus.

BACKGROUND OF THE INVENTION

There is a general need in research and enforcement activities relating to environmental pollution, and similar undesirable conditions, for reliable and accurate systems for the monitoring of such conditions. For example, in industrial establishments there is a need for a system which will make available the time-history of the noise levels throughout an entire work shift, without requiring the services of a trained industrial hygienist who would be employed to perform personally an accurate noise level-versus-time survey during said work shift. Furthermore, there is a need for a technique for making measurements of noise, or other adverse conditions, in areas where only the workers have access, and to enable computation of the threshold limit values of the monitored conditions. In the case of noise, it is desirable for administrators to be able to examine a noise environment and to determine just when noise exposure is imposed on a worker and to obtain information as to whether administrative controls are required. The same considerations apply for other environmental conditions, such as exposure to carbon monoxide, hydrogen sulfide, hydrocarbons, halogens, heat stress, or the like, where it is important for researchers to obtain data on a concentration-versus-time basis.

In the case of noise pollution, various noise dosimeters have been devised, for example, those which continuously integrate the sound level throughout a work shift and present a single number at the end of the day which can be related to an equivalent sound pressure level. However, the prior art devices do not preserve the actual sound levels and cannot present them in an actual reconstruction indicating exactly when the noise events occurred. None of the prior art dosimeters now commercially available provides the ability to view the day's noise as it varied with time during the work shift.

Some of the prior systems devised are disclosed in the prior U.S. Pat. Nos. Thus, broadly speaking:

Fletcher, 3,868,856 measures sound pressure level using a transducer, produces a signal proportional thereto, and records it on magnetic tape.

Labarber et al., 3,828,279 shows a system using transducer and time modulator, with a gate controlling strings of pulses passing to a pulse counter and memory circuit which provides digital representation and storage of condition inputs to transducers.

Quinn, 3,892,133 uses audio level sensor which provides a sensor signal indicating the amplitude. A recorder is used to indicate the level of sound over a period of time.

Rackey et al., 2,590,460 shows sound level and duration measurement using pulses and means for counting the pulses.

Von Wittern et al., 2,884,085 provides noise exposure meter indicating total time that noise exceeds a predetermined level.

Peake et al. 3,802,535 employs a system wherein pulse frequency is proportional to sound intensity variation, with a binary pulse counter.

Church et al., 3,236,327 uses time recording device triggered by sound level sensing system, and employs electrochemical recording means.

However, as pointed out above, the prior art does not accomplish the desired objectives.

SUMMARY OF THE INVENTION

Accordingly, an object of the present invention is to overcome deficiencies in the prior art, such as indicated above.

Another object is to provide for improved environmental sampling.

Yet another object of the invention is to provide a novel and improved method and means to sample the level of noise present in an area to be monitored on a periodic basis and to maintain a record of the noise levels for subsequent analysis, the apparatus required being relatively simple, the method requiring no prior integration techniques, the system providing a recording of the actual sound levels, which can be presented in a manner enabling accurate information to be obtained as to when the noise events occurred, the enabling the noise level-versus-time recording to be visually reproduced.

A further object of the invention is to provide an improved method and apparatus for sampling the level of noise present in an industrial establishment, or other area to be monitored, on a periodic basis and for maintaining a magnetic tape record of the noise levels as they occurred, for subsequent analysis, the technique of the present invention permitting measurement in areas where only the worker has access, permitting easy computation of threshold limit values, permitting practicable examination of a noise environment to determine at what times workers are exposed to peak noise levels and to determine if administrative controls are indicated, and the system being arranged to avoid errors which might otherwise be caused by mechanical inertia of its recording equipment, namely, starting inertia of its tape recorder drive motor and associated driven parts.

A still further object of the invention is to provide an improved noise dosimeter system which uses an electrical signal from a sound level meter as its input, but which is readily adaptable to other industrial hygiene instrumentation problems relating to various types of pollutants, such as carbon monoxide, hydrogen sulfide, hydrocarbons, halogens, heat, or other toxic agencies requiring monitoring on a concentration-versus-time basis, wherein input transducers responsive to the conditions are available to develop electrical signals in accordance with the strength or concentration of the conditions, and which can be easily embodied in wearable or portable pollution-monitoring devices.

BRIEF DESCRIPTION OF THE DRAWINGS

Further objects and advantages of the invention will become apparent from the following description of embodiments, and from the accompanying drawing thereof, wherein.

DESCRIPTION OF A PREFERRED EMBODIMENT

Figure 1:
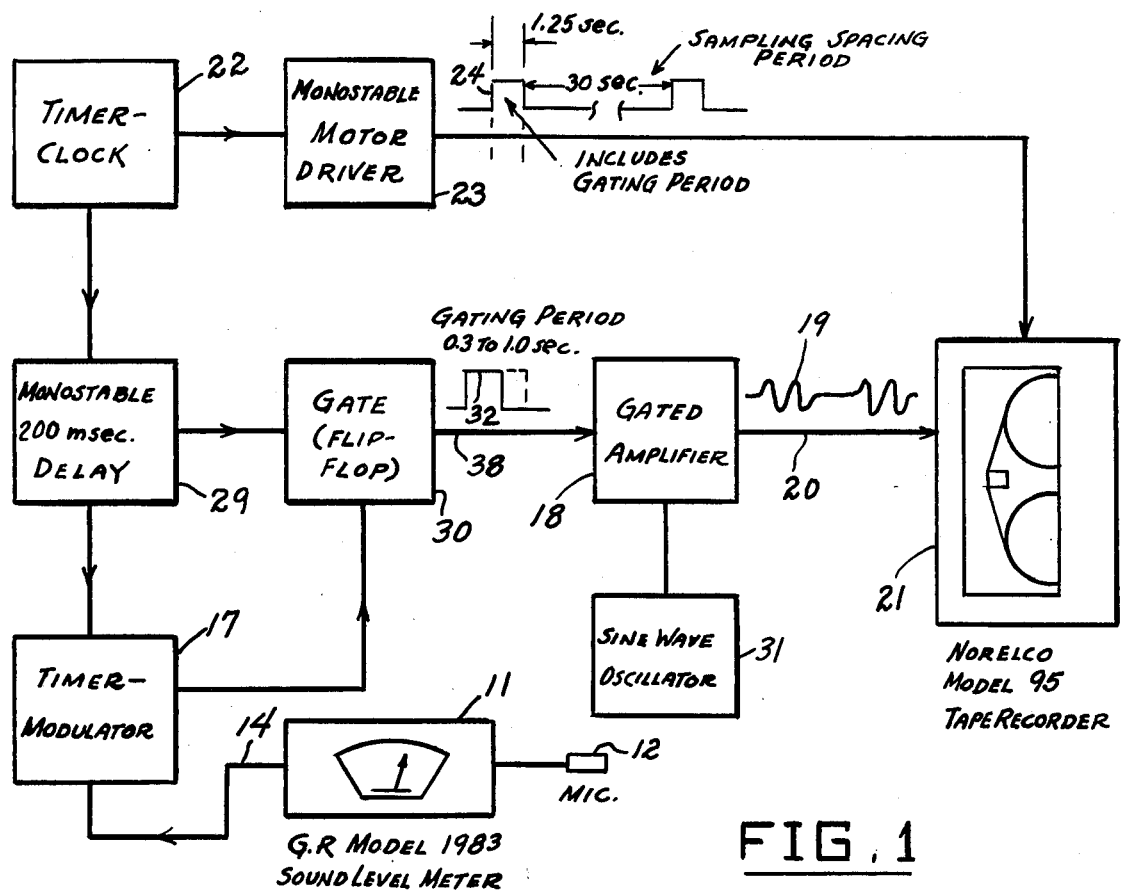
FIG. 1 is a block diagram of a noise chrono-dosimeter recording system according to the present invention.
Figure 3:
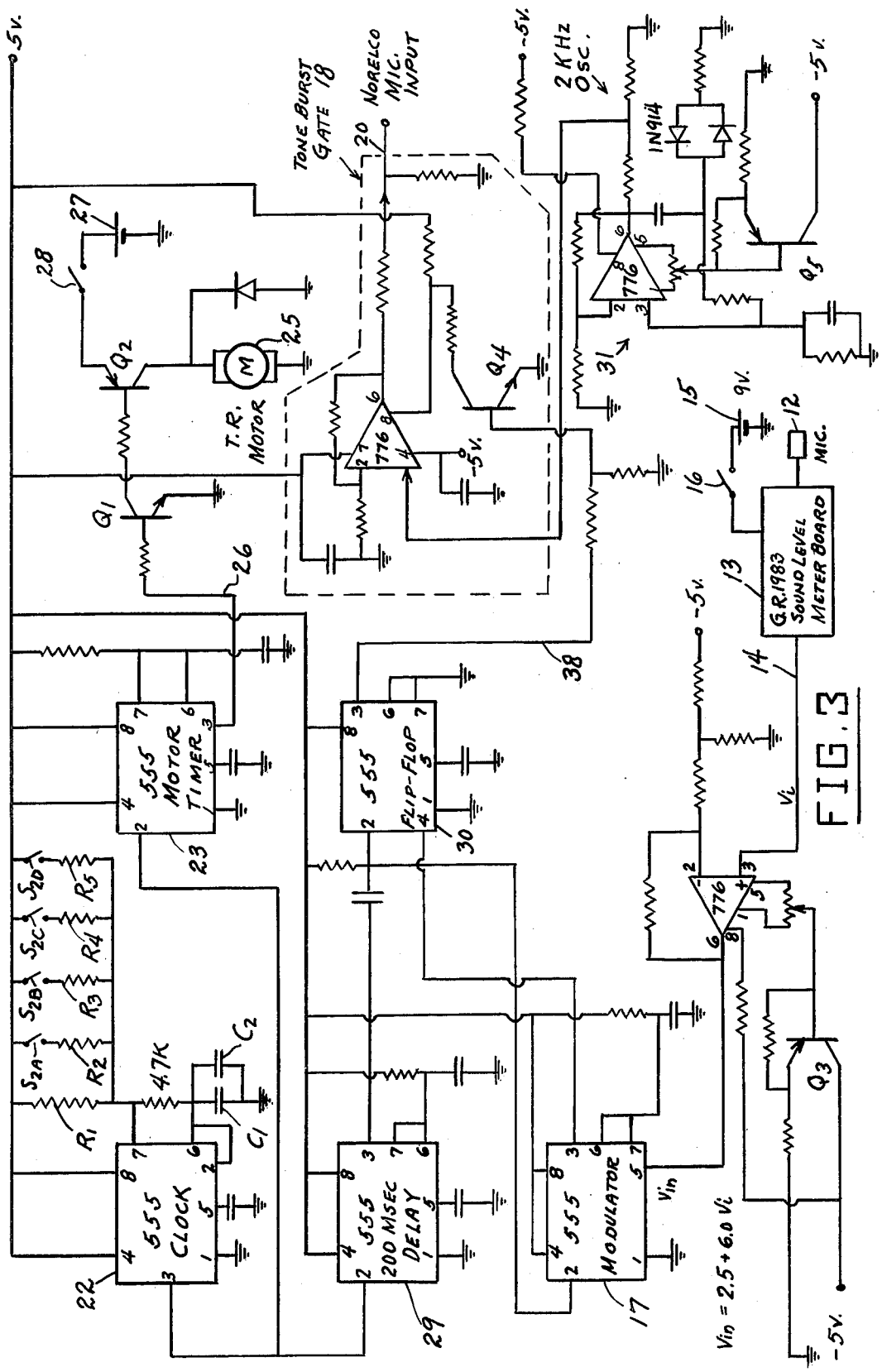
FIG. 3 is a schematic wiring diagram of a typical system according to FIG. 1.

Referring to the drawings, and more particularly to FIG. 1, 11 designates a conventional sound level meter of the type generating a d.c. voltage output in accordance with sound received by an input microphone 12 exposed in an area to be monitored, For example, the meter 11 may comprise a General Radio Model 1983 sound level meter having a terminal board 13 (FIG. 3) with a voltage output line 14. The meter may be provided with a suitable energy source, such as a battery 15 connected to appropriate terminals on board 13 through a control switch 16. The d.c. output from the General Radio Model 1983 sound level meter is a voltage which varies linearly from 0.0 to 250 mv. as the sound level meter responds from 70 decibels to full scale (120 decibels) meter deflection. As will be presently explained, this voltage is used to determine the length of time that an electronic timer 17 is turned on, varying from approximately 0.3 second to 1.0 second. The timer 17 may comprise a conventional Type 555 IC circuit (see FIG. 3) and controls an electronic gate circuit 18 that allows a string of pulses 19 (a tone burst of sine waves) to pass through to a line 20 connected to the input of a miniature audio tape recorder 21, such as a Norelco Model 95. These pulses are recorded on said tape recorder 21. Said tape recorder 21 is turned on periodically by a clock switch device 22 and a motor driver stage 23 to take a noise level sample. Thus, each sample is recorded as a single string of pulses 19. The sample spacing can be made to vary from seconds up to hours by switching in various resistor-capacitor combinations. Thus, as shown in FIG. 3, switches $S_{2A}$ to $S_{2D}$ may be employed to selectively place resistors $R_2$ to $R_5$ in parallel with resistor $R_1$ in an R-C circuit including capacitors $C_1$, $C_2$, giving a large number of possible combinations. In a typical embodiment, the apparatus has a switch-selectable sample spacing time constant of 5, 10, 15, 30, 60 or 120 seconds.

In said typical embodiment, the motor driver stage 23 comprises a monostable driver unit of conventional design employing a Type 555 IC unit, providing a 1.25 second output (control) pulse 24, which therefore drives the tape recorder motor 25 from a battery 27 through a manual control switch 28 (see FIG. 3) via a line 26 and transistors $Q_1$, $Q_2$ for 1.25 seconds.

The first 0.2 second of tape is always left blank by the action of a delay device 29 (which may employ a Type 555 IC unit giving a 200 msec delay) and a gated flip-flop 30 (which may also employ a Type 555 IC unit), to allow the recorder motor 25 to come up to speed. The pulses 19 from a conventional oscillator 31 fill up the next 1.0 second, the length of recording time depending upon the d.c. output voltage on the line 14 provided by the sound level meter 11. The frequency of oscillator 31 is set at 2000 Hz to maximize the resolution of the measurements, while operating well within the frequency response capability of the tape recorder 21, which falls off rapidly above 2500 Hz. Thus, a high fidelity tape recorder is not required, since the device is only recording a string of pulses 19 at a constant frequency. Moreover, it is not essential that the tape recorder speed be precisely constant. The number of pulses recorded in each pulse-string is proportional to the d.c. voltage output level of the noise environment being monitored. Although this proportionality may not be perfectly linear, any nonlinearity can be automatically compensated for by the programmable electronic calculator or computer employed for playback, as will be presently described. The gate 30 has an output line 38 which carries the output pulse 32, variable in width between 0.3 second and 1.0 second which correspondingly controls the duration of the tone bursts 19 delivered to the tape recorder input line 20, said duration being therefore in accordance with the output voltage level of the sound level meter 11.

Data playback can be performed at the user's convenience, and requires only reading out and analyzing the contents of the tape to be able to plot the time history of the noise environment being sampled. The typical Norelco cassette tapes contain 15 minutes (900 seconds) of tape which, when used up to 1.25 seconds at a time, provide 720 samples. If the basic sampling rate is set at once per minute, then 720 minutes (480 minutes = 8 hours) can be sampled before a tape is filled. If samples are taken every 5 seconds, then the tape will be filled in approximately 1 hour. Therefore, depending upon the accuracy needed, sampling rates can be coupled with tape changes to document the exposure to noise throughout a work shift.

Figure 2:
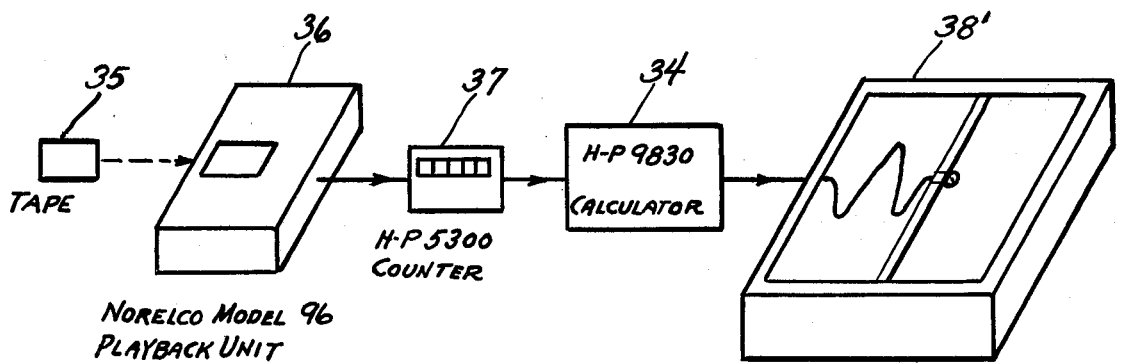
FIG. 2 is a schematic diagram showing a system which may be employed for reading data from the tapes obtained from the recording system of FIG. 1 and for obtaining a visual plot of the data.

FIG. 2 shows a typical system for reading data from the tapes and for subsequent date processing. A Hewlett-Packard Model 9830 calculator system, shown at 34, is used to process the noise data from a tape 35. The tape 35 is played back through a Norelco Model 96 desk top dictating unit, shown at 36, into a Hewlett-Packard Model 5300 frequency counter 37. Although the tape is typically played back at normal speed (15 minutes per side) it is actually possible to perform playback at any speed that can be handled by the data processing equipment and that is within the mechanical design limitations of the tape cassette. The counter 37 counts counts the pulses it sees on each 1.25 second portion of tape and feeds the count to the calculator 34. Calculator 34 stores the counts in its internal memory array until the entire tape (or tapes) has been played back. A suitable program can be written which converts the numbers of pulses into noise levels and then performs various operations on the stored data, including plotting the time history of the noise exposure on the Hewlett-Packard Model 9862A Plotter, shown at 38 [1]. Since the relationship between the noise level and the number of pulses is not perfectly linear, the calculator 34 is programmed to construct a piecewiselinear function by which noise levels are interpolated.

Laboratory and field tests have shown that the above-described noise chrono-dosimeter system is accurate to within one decibel from 70 to 120 decibels, is repeatable to within 0.5 decibel, and can detect a change in sound pressure level of less than 0.5 decibel.

The above-described monitoring system can be used to measure on a periodic basis any pollutant or environmental condition for which there is a suitable condition-responsive transducer which generates an electrical signal to quantitatively represent the condition being monitored. Examples of such further uses of the general system of the present invention are as 1) a carbon monoxide chrono-dosimeter, 2) a hydrocarbon chrono-dosimeter, 3) a heat stress chrono-dosimeter, 4) a temperature chrono-dosimeter, 5) a hydrogen sulfide chrono-dosimeter, 6) a halogen chrono-dosimeter, or as a chrono-dosimeter for any other chemical or physical agent which can be monitored by means of an electrical transducer, the only change being to substitute the appropriate electrical transducer for the sound level meter 11 shown in FIG. 1.

The system of the present invention is therefore of high value for documenting noise or contaminant levels and for purposes of researching the health effects of physical and chemical agents, for monitoring processes, and for enforcing health regulations, such as currently proposed noise level standards in industry.

While a specific embodiment of an improved condition-monitoring system has been disclosed in the foregoing description, it will be understood that various modifications within the scope of the invention may occur to those skilled in the art. Therefore it is intended that adaptations and modifications should and are intended to be comprehended within the meaning and range of equivalents of the disclosed embodiments.

What is claimed is:

1. A system for the periodic sampling and recording of a changeable condition in an area, comprising magnetic tape recorder means, timed clock and operating period-defining means drivingly connected to said tape recorder means and driving said tape recorder means for a predetermined operating period at the end of successive sampling spaced periods, condition-responsive transducer means located in said area to develop an electrical signal changing in strength in accordance with said condition, oscillator means generating constant-frequency waves, variableperiod gating means, means to adjust the gating period of said gating means in accordance with the strength of said electrical signal, means controlled by said timed clock and period-defining means to gate said waves with said gating means after each sampling spacing period and during an operating period of said tape recorder means, whereby to produce successive timed strings of pulses whose number is in accordance with the respective strengths of said electrical signal after said sampling spacing periods, means to supply said strings of pulses as an input to said magnetic recorder means, whereby to provide a tape recording containing the respective strings of pulses representing the respective strengths of said transducer-developed electrical signals during the gating periods, and means to delay each gating of said oscillator waves for a time sufficient to enable said tape recorder means to attain a substantially steady speed.

2. The system of claim 1, and means to delay each gating of said oscillator waves for at least 200 milliseconds to enable said tape recorder means to attain said substantially steady speed.

3. The system of claim 1, and means to vary the sampling spacing periods over a range of between approximately 5 seconds to approximately 120 seconds.

4. The system of claim 1, and wherein said oscillator means generates waves of a constant frequency below approximately 2500 Hz.

5. The system of claim 4, and wherein the gating periods of said waves varies between approximately 0.3 second and 1.0 second.

6. The system of claim 5, and means to delay each gating of said oscillator waves for a period of at least 200 milliseconds after the beginning of the driving of the tape recording means to enable said tape recorder means to attain said substantially steady speed.

7. The system of claim 1, and wherein said transducer means is responsive to sound to develop an electrical signal changing in accordance with sound level.

8. A method of monitoring a changeable condition in an area comprising generating an electrical signal in accordance with said condition, establishing a series of periodic sampling intervals, successively gating the output of a constant-frequency oscillator at said periodic intervals for time periods corresponding to the strength of said electrical signals at each interval, whereby to provide strings of pulses whose numbers correspond to the strengths of the electrical signals, sequentially recording the strings of pulses in said intervals, imposing a predetermined time delay between the beginning of each interval and the gating of said output sufficient to compensate for recording apparatus inertia effects and to insure inclusion of all pulses in the recording, and subsequently chronographically plotting the numbers of the recorded strings of pulses.

9. The method of claim 8, and wherein said changeable condition comprises changing sound levels in said area.

* * * * *